(12) United States Patent
Iriyama et al.

(10) Patent No.: US 7,312,000 B2
(45) Date of Patent: Dec. 25, 2007

(54) ELECTROLYTIC SOLUTION FOR SECONDARY BATTERY AND SECONDARY BATTERY CONTAINING THE SAME

(75) Inventors: Jiro Iriyama, Tokyo (JP); Yukiko Morioka, Tokyo (JP); Sigeyuki Iwasa, Tokyo (JP); Kentaro Nakahara, Tokyo (JP); Masaharu Satoh, Tokyo (JP); Masahiro Suguro, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 10/483,043

(22) PCT Filed: Dec. 12, 2002

(86) PCT No.: PCT/JP02/13013

§ 371 (c)(1),
(2), (4) Date: Apr. 28, 2004

(87) PCT Pub. No.: WO03/054997

PCT Pub. Date: Jul. 3, 2003

(65) Prior Publication Data

US 2004/0197664 A1    Oct. 7, 2004

(30) Foreign Application Priority Data

Dec. 12, 2001    (JP)    ............... 2001-378625

(51) Int. Cl.
*H01M 10/40*    (2006.01)
(52) U.S. Cl. .................. 429/328; 429/336; 429/339
(58) Field of Classification Search ................ 429/326, 429/328, 336, 339

See application file for complete search history.

(56) References Cited

U.S. PATENT DOCUMENTS 3,553,208 A * 1/1971 Abushanab ............... 544/353

(Continued)

FOREIGN PATENT DOCUMENTS

EP    1 172 878 A2    1/2002

(Continued)

OTHER PUBLICATIONS

M. Cooper et al., "Oxidation Reactions Using Urea-Hydrogen Peroxide; A Safe Alternative to Anhydrous Hydrogen Peroxide", LETTER, (Sep. 1999), pp. 533-535 with Abstract.

*Primary Examiner*—Stephen J. Kalafut
(74) *Attorney, Agent, or Firm*—Sughrue Mion Pllc.

(57) ABSTRACT

A battery, which has excellent safety in an overcharged state and is excellent in low-temperature characteristics and cycle characteristics, is provided.

The electrolytic solution of the secondary battery contains a compound which has a diazine N,N'-dioxide structure represented by general formula (1).

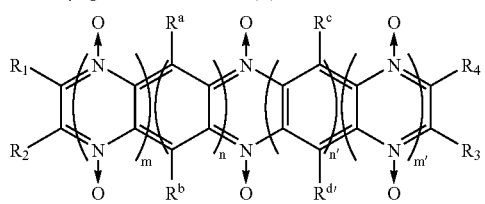

in which, n, m, n', and m' each independently are an integer 0 or larger; the diazine rings and the benzene rings may be condensed alternately or randomly; and substituents $R_1$, $R_2$, $R_3$, $R_4$, $R^a$, $R^b$, $R^c$, and $R^d$ each independently represent hydrogen atom, halogen atom, or specific group. However, when n is 2 or larger, then $R^a$ and $R^b$ may be the same or different, and when n' is 2 or larger, then $R^c$ and $R^d$ may be the same or different. In addition, these substituents, in cooperation with each other, may form a ring structure.

14 Claims, 1 Drawing Sheet

U.S. PATENT DOCUMENTS

| | | | |
|---|---|---|---|
| 3,567,728 A * | 3/1971 | Johnston et al. ............ 544/343 |
| 3,594,381 A * | 7/1971 | Seng et al. ................. 544/343 |
| 3,594,382 A * | 7/1971 | Seng et al. ................. 544/347 |
| 3,900,473 A * | 8/1975 | Diel et al. ..................... 526/74 |
| 5,731,106 A | 3/1998 | Tsutsumi et al. |
| 7,018,738 B2 * | 3/2006 | Morioka et al. ............ 429/213 |
| 2002/0009652 A1 | 1/2002 | Ueda et al. |

FOREIGN PATENT DOCUMENTS

| | | |
|---|---|---|
| JP | 7-302614 A | 11/1995 |
| JP | 9-50822 A | 2/1997 |
| JP | 9-106835 A | 4/1997 |
| JP | 9-204932 A | 8/1997 |
| JP | 9-213348 A | 8/1997 |
| JP | 10-50344 A | 2/1998 |
| JP | 11-273734 A | 10/1999 |
| JP | 2001-15155 A | 1/2001 |
| JP | 2001-23687 A | 1/2001 |
| JP | 2001-512903 A | 8/2001 |
| JP | 2001-345119 A | 12/2001 |
| WO | WO 99/08299 A1 | 2/1999 |

* cited by examiner

FIG. 1

ELECTROLYTIC SOLUTION FOR SECONDARY BATTERY AND SECONDARY BATTERY CONTAINING THE SAME

TECHNICAL FIELD

The present invention relates to an electrolytic solution for a secondary battery and a secondary battery using the same.

BACKGROUND ART

A battery is a device which can take out chemical energy as electric energy utilizing oxidation-reduction reactions occurring on a positive electrode and a negative electrode or can store electric energy as chemical energy, and is utilized as a power source in various equipment.

Recently, along with the rapid spread of mobile electronic equipment, there have been increased needs for a lightweight battery with a large capacity. In order to satisfy the needs, batteries, which utilize alkali metal whose mass per unit electric charge is light, have been developed. Among these batteries, a secondary battery using lithium ions as a carrier is particularly utilized for various mobile equipment for its superiority in charge and discharge characteristics and large capacity.

However, in such lithium-ion secondary battery, when the battery is overcharged due to failures in the power supply circuit and battery charger of electronic equipment or misuse of electronic equipment, excess lithium ions are released from the positive electrode, which sometimes causes thermal instability in active materials in the positive electrode. When being thermally instable, the positive electrode undergoes an abrupt exothermic reaction with an electrolytic solution. If the exothermic reaction proceeds to a considerable extent, it may leads to damage to the battery or the ignition of the battery. Consequently, it is important issues to prevent the battery from being overcharged and assure safety.

For the purpose of ensuring safety on the occasion when the battery is overcharged, there have been proposed protective devices or elements, such as a polyswitch, a PTC element, a temperature fuse, a current fuse, etc., a overcharge prevention circuit and the like. The use of the protective element or the prevention circuit, however, imposes significant limits on the miniaturization of a battery pack and cost savings. Therefore, the safety of the battery should preferably be secured without using the protective element or the prevention circuit.

To solve the problem, it has been proposed that the battery contain such additives as to improve safety at the time of overcharging the battery.

For example, Japanese Patent Application laid open No. HEI7-302614 and Japanese Patent Application laid open No. HEI9-50822 have disclosed a nonaqueous electrolyte second battery using metal material consisting mainly of lithium or carbon material capable of doping/undoping lithium for the negative electrode, and lithium and an complex oxide of transition metals for the positive electrode, in which a nonaqueous electrolytic solution contains a benzenes compound (anisole derivative(s), xylene derivative(s), etc.) or a biphenyl compound (dimethoxy-biphenyl derivative(s)) having a molecular weight of 500 or less, with a π orbital electron that exhibits a reversible redox (oxidation-reduction) potential more noble than the potential at the positive electrode of the fully charged battery. According to the patent applications, with the addition of such aromatic compounds to the electrolytic solution, an overcharge reaction or the excessive release of lithium from the positive electrode is prevented, which improves the safety and reliability of the battery.

Additionally, Japanese Patent Application laid open No. HEI9-106835 has disclosed a nonaqueous lithium battery using a lithium adjected compound for the positive electrode and a carbonaceous compound for the negative electrode, in which an electrolytic solution contains aromatic additives such as biphenyl, 3-chloro-thiophene, furan or the like. From its description, these additives are polymerized at a battery voltage higher than the maximum operating voltage of the battery, which increases the inner voltage of the battery, and, therefore, protects the battery in an overcharged state.

Besides, Japanese Patent Application laid open No. 2001-15155 has disclosed an electrolytic solution for a lithium secondary battery obtained by dissolving the lithium salt in an organic solvent, in which a phenyl group contains an alkylbenzene derivative(s) or a cycloalkylbenzene derivative(s) having adjacent tertiary carbon. These additives are polymerized under the condition of overcharge, and generate a polymer that is unlikely to remelt. The polymer is said to act as a resistor or a resistive element. In addition, there is described in the patent application a battery with an electric current breaker that interrupts charging when the gas pressure inside the battery is equal to or more than a prescribed value. It is alleged that hydrogen gas is exhaled due to decomposition of the additives when the battery is overcharged, which activates the electric current breaker to prevent the overcharge.

Problems that the Invention is to Solve

However, with the use of the anisole derivatives described in Japanese Patent Application laid open No. HEI7-302614, the biphenyl compounds described in Japanese Patent Application laid open Nos. HEI9-50822 and No. HEI9-106835 or the aromatic compounds described in these patent applications as additive to the electrolytic solution of the nonaqueous lithium battery, safety is not sufficiently ensured in the case where the battery has been overcharged for a long time with a low electrical current. Moreover, the aromatic additives such as 3-chloro-thiophene, furan and the like are hard to deal with, and may have adverse effects on battery characteristics depending on oxidation decomposition and the like. Furthermore, when the anisole derivatives or the biphenyl compounds are added to the electrolytic solution, the cycle characteristic and the low-temperature characteristic of the battery are deteriorated. Similarly, in the case where the alkylbenzene derivatives are added to the electrolytic solution as described in Japanese Patent Application laid open No. 2001-15155, the cycle characteristic of the battery is deteriorated.

As set forth hereinbefore, there have been proposed several additives to the battery electrolyte for increasing the safety of an overcharged battery. However, there is yet no additive that can ensure the safety of a battery in an overcharged state without adversely affecting battery characteristics.

It is therefore an object of the present invention to provide a battery, which has excellent safety in an overcharged state and is excellent in battery characteristics such as low-temperature characteristics and cycle characteristics.

DISCLOSURE OF THE INVENTION

As a result of extensive and thorough research, the inventors found out that the safety of a battery in an overcharged state could be improved without deteriorating battery characteristics by adding a compound having a diazine N,N'-dioxide structure to an electrolytic solution. In accordance with the present invention, there is provided a battery which has excellent safety in an overcharged state and is excellent in battery characteristics, wherein an electrolytic solution contains such specific compound having the diazine N,N'-dioxide structure.

The present invention relates to an electrolytic solution for a secondary battery characterized by containing a compound which has the diazine N,N'-dioxide structure expressed by the following formula (1):

(1)

in which, n, m, n', and m' each independently denote an integer 0 (zero) or larger; the diazine rings and the benzene rings may be condensed alternately or randomly; and substituents $R_1$, $R_2$, $R_3$, $R_4$, $R^a$, $R^b$, $R^c$, and $R^d$ each independently represent a univalent group selected from hydrogen atom, halogen atom, hydroxyl group, nitro group, nitroso group, cyano group, carboxyl group, substituted or unsubstituted alkyl group, substituted or unsubstituted alkenyl group, substituted or unsubstituted cycloalkyl group, substituted or unsubstituted aromatic hydrocarbon group, substituted or unsubstituted aromatic heterocyclic group, substituted or unsubstituted aralkyl group, substituted or unsubstituted amino group, substituted or unsubstituted alkoxy group, substituted or unsubstituted aryloxy group, substituted or unsubstituted alkoxycarbonyl group, substituted or unsubstituted aryloxycarbonyl group, and substituted or unsubstituted acyl group. Incidentally, when n is 2 or larger, then $R^a$ and $R^b$ may be the same or different, and when n' is 2 or larger, then $R^c$ and $R^d$ may be the same or different. Besides, in these substituents, one or more of the atoms may be substituted with a sulfur atom(s), a silicon atom(s), a phosphorus atom(s) or a boron atom(s), and the substituents may form a ring structure in cooperation with each other.

The present invention also relates to an electrolytic solution for a secondary battery characterized by containing an oligomer or polymer compound which includes a bivalent group having two bonds as a structure unit in substitution for two of the substituents $R_1$, $R_2$, $R_3$, $R_4$, $R^a$, $R^b$, $R^c$, and $R^d$ of the compound provided with the diazine N,N'-dioxide structure expressed by the above formula (1).

The present invention also relates to the electrolytic solution for a secondary battery as described above, characterized in that at least part of the aforementioned compound provided with the diazine N,N'-dioxide structure expressed by the above formula (1) or the oligomer or polymer compound which includes a bivalent group having two bonds as a structure unit in substitution for two of the substituents $R_1$, $R_2$, $R_3$, $R_4$, $R^a$, $R^b$, $R^c$, and $R^d$ in formula (1) is dissolved in the electrolytic solution.

The present invention also relates to the electrolytic solution for a secondary battery as described above, wherein an organic solvent in which the lithium salt is dissolved is used as a solvent.

The present invention also relates to a secondary battery comprising a positive electrode, a negative electrode, and any one of the electrolytic solutions as described above.

In another aspect of the present invention, the aforementioned secondary battery is a lithium secondary battery.

Incidentally, in accordance with the present invention, the lithium secondary battery is a secondary battery in which, lithium ions are included in charged particles that carry electrical current.

BRIEF DESCRIPTION OF THE DRAWINGS

Incidentally, the reference numeral 1 represents an electrode element. The reference numeral 2 represents a positive electrode tab. The reference numeral 3 represents a negative electrode tab. The reference numeral 4 represents a laminate film.

BEST MODE FOR CARRYING OUT THE INVENTION

In accordance with the present invention, an electrolytic solution for a secondary battery contains a compound provided with the diazine N,N'-dioxide structure expressed by general formula (1), or an oligomer or polymer compound (hereinafter, these compounds are referred to as "diazine N,N'-dioxide compound" as appropriate) which includes a bivalent group having two bonds as a structure unit in substitution for two of the substituents $R_1$, $R_2$, $R_3$, $R_4$, $R^a$, $R^b$, $R^c$, and $R^d$ of the compound. In one preferred embodiment of the present invention, an organic solvent in which the lithium salt is dissolved is used as a solvent. Such electrolytic solution can be suitably used for a lithium secondary battery which is required to ensure safety when overcharged.

Additionally, in accordance with the present invention, a secondary battery comprises a positive electrode, a negative electrode, and the electrolytic solution containing the diazine N,N'-dioxide compound. The secondary battery may have a configuration in which the positive electrode and the negative electrode are arranged in layers via a separator, and the layers are accommodated in a container together with the above-mentioned electrolytic solution, the container being sealed. It is desirable in the interest of the battery capacity that the secondary battery of the present invention be a lithium secondary battery including lithium ions as electrolyte cations. For example, metal or carbon material consisting mainly of lithium is used as the active material of the negative electrode, and a lithium containing transition metal oxide as the active material of the positive electrode.

Figure 1:
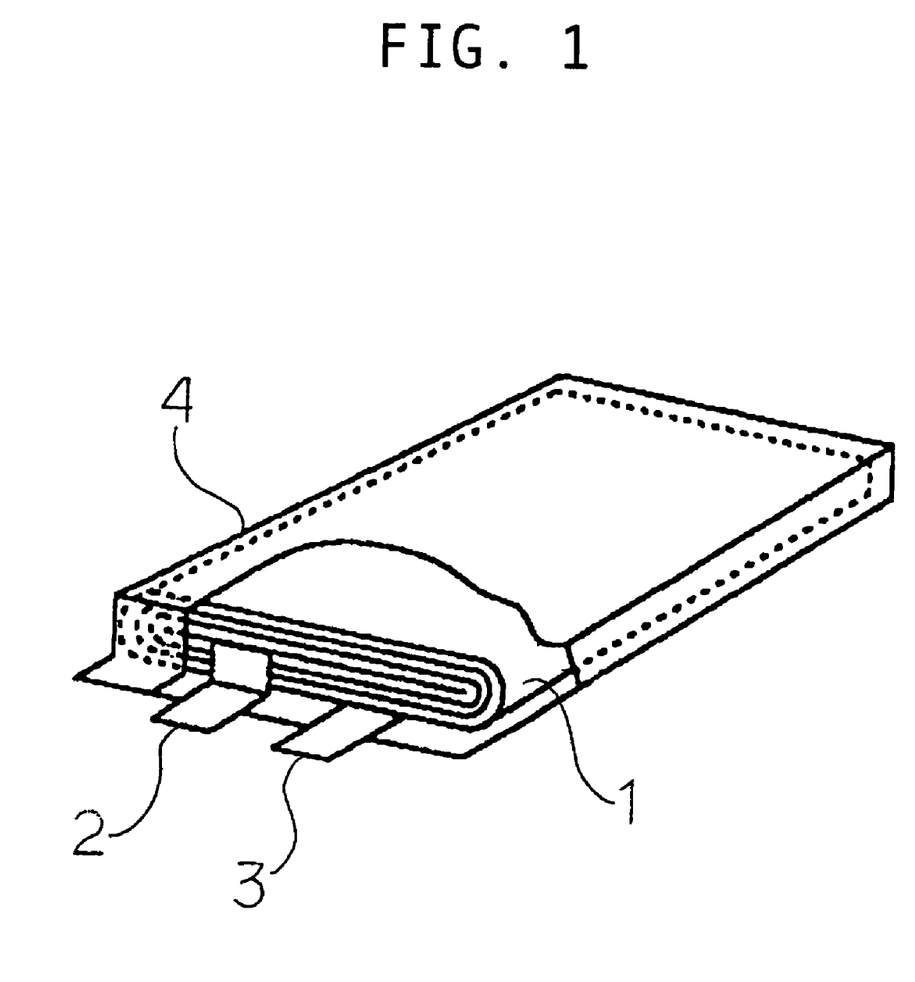
FIG. 1 is a diagram showing an example of the configuration of a battery according to the present invention.

FIG. 1 is a diagram showing the configuration of a secondary battery according to an embodiment of the present invention. Referring to FIG. 1, the battery comprises a positive electrode and a negative electrode each having a positive electrode tab 2 and a negative electrode tab 3, and an electrode element 1 formed by stacking these electrodes in layers with a separator therebetween and winding the layered electrodes. The electrode element 1 and the electrolytic solution are accommodated in a laminate film being an exterior body.

In the following, a description will be made of the electrolytic solution for a secondary battery and the secondary battery using the same.

[1] Electrolytic Solution

[1-1] Diazine N,N'-dioxide Compound

Examples of the diazine N,N'-dioxide compound contained in the electrolytic solution of the present invention include diazine compounds represented by the above general formula (1) (compounds which satisfy $n+m+n'+m'=0$ in general formula (1)), polyacene type compounds (compounds which satisfy $n+m+n'+m'\geqq 0$ in general formula (1)), and oligomer or polymer compounds provided with a bivalent group having two bonds as a structure unit in the rings of these compounds. These diazine N,N'-dioxide compounds can be used either singularly or in combination with each other as a combination of two or more kinds.

In the above general formula (1), the halogen atoms in the substituents $R_1$, $R_2$, $R_3$, $R_4$, $R^a$, $R^b$, $R^c$, and $R^d$ are, for example, fluorine, chlorine, bromine, iodine or the like. The substituents can have one kind alone or a combination of two or more kinds of these halogen atoms.

Examples of the substituted or unsubstituted alkyl groups include: methyl group; ethyl group; propyl group; isopropyl group; n-butyl group; s-butyl group; isobutyl group; t-butyl group; n-pentyl group; n-hexyl group; n-heptyl group; n-octyl group; hydroxymethyl group; 1-hydroxyethyl group; 2-hydroxyethyl group; 2-hydroxyisobutyl group; 1,2-dihydroxyethyl group; 1,3-dihydroxyisopropyl group; 2,3-dihydroxy-t-butyl group; 1,2,3-trihydroxypropyl group; chloromethyl group; 1-chloroethyl group; 2-chloroethyl group; 2-chloroisobutyl group; 1,2-dichloroethyl group; 1,3-dichloroisopropyl group; 2,3-dichloro-t-butyl group; 1,2,3-trichloropropyl group; bromomethyl group; 1-bromoethyl group; 2-bromoethyl group; 2-bromoisobutyl group; 1,2-dibromoethyl group; 1,3-dibromoisopropyl group; 2,3-dibromo-t-butyl group; 1,2,3-tribromopropyl group; iodomethyl group; 1-iodoethyl-group; 2-iodoethyl group; 2-iodoisobutyl group; 1,2-diiodoethyl group; 1,3-diiodoisopropyl group; 2,3-diiodo-t-butyl group; 1,2,3-triiodopropyl group; aminomethyl group; 1-aminoethyl group; 2-aminoethyl group; 2-aminoisobutyl group; 1,2-diaminoethyl group; 1,3-diaminoisopropyl group; 2,3-diamino-t-butyl group; 1,2,3-triaminopropyl group; cyanomethyl group; 1-cyanoethyl group; 2-cyanoethyl group; 2-cyanoisobutyl group; 1,2-dicyanoethyl group; 1,3-dicyanoisopropyl group; 2,3-dicyano-t-butyl group; 1,2,3-tricyanopropyl group; nitromethyl group; 1-nitroethyl group; 2-nitroethyl group; 2-nitroisobutyl group; 1,2-dinitroethyl group; 1,3-dinitroisopropyl group; 2,3-dinitro-t-butyl group; and 1,2,3-trinitropropyl group. The compounds can have one kind alone or a combination of two or more kinds of these groups.

Examples of the substituted or unsubstituted alkenyl groups include: vinyl group; allyl group; 1-butenyl group; 2-butenyl group; 3-butenyl group; 1,3-butanedienyl group; 1-methylvinyl group; styryl group; 2,2-diphenylvinyl group; 1,2-diphenylvinyl group; 1-methylallyl group; 1,1-dimethylallyl group; 2-methylallyl group; 1-phenylallyl group; 2-phenylallyl group; 3-phenylallyl group; 3,3-diphenylallyl group; 1,2-dimethylallyl group; 1-phenyl-1-butenyl group, and 3-phenyl-1-butenyl group. The compounds can have one kind alone or a combination of two or more kinds of these groups.

Examples of the substituted or unsubstituted cycloalkyl groups include cyclopropyl group, cyclobutyl group, cyclopentyl group, cyclohexyl group and 4-methylcyclohexyl group. The compounds can have one kind alone or a combination of two or more kinds of these groups.

Examples of the substituted or unsubstituted aromatic hydrocarbon groups include: phenyl group; 1-naphthyl group; 2-naphthyl group; 9-fluorenyl group; 1-anthryl group; 2-anthryl group; 9-anthryl group; 1-phenanthryl group; 2-phenanthryl group; 3-phenanthryl group; 4-phenanthryl group; 9-phenanthryl group; 1-naphtacenyl group; 2-naphtacenyl group; 9-naphtacenyl group; 1-pyrenyl group; 2-pyrenyl group; 4-pyrenyl group; 2-biphenylyl group; 3-biphenylyl group; 4-biphenylyl group; p-terphenyl-4-yl group; p-terphenyl-3-yl group; p-terphenyl-2-yl group; m-terphenyl-4-yl group; m-terphenyl-3-yl group; m-terphenyl-2-yl group; o-tolyl group; m-tolyl group; p-tolyl group; p-t-butylphenyl group; p-(2-phenylpropyl) phenyl group; 3-methyl-2-naphthyl group; 4-methyl-1-naphthyl group; 4-methyl-1-anthryl group; 4'-methylbiphenylyl group; 4"-t-butyl-p-terphenyl-4-yl group; and the derivatives of these groups. The compounds can have one kind alone or a combination of two or more kinds of these groups.

Examples of the substituted or unsubstituted aromatic heterocyclic groups include: 1-pyrrolyl group; 2-pyrrolyl group; 3-pyrrolyl group; pyrazinyl group; 2-pyridinyl group; 3-pyridinyl group; 4-pyridinyl group; 1-indolyl group; 2-indolyl group; 3-indolyl group; 4-indolyl group; 5-indolyl group; 6-indolyl group; 7-indolyl group; 1-isoindolyl group; 2-isoindolyl group; 3-isoindolyl group; 4-isoindolyl group; 5-isoindolyl group; 6-isoindolyl group; 7-isoindolyl group; 2-furil group; 3-furil group; 2-benzofuranyl group; 3-benzofuranyl group; 4-benzofuranyl group; 5-benzofuranyl group; 6-benzofuranyl group; 7-benzofuranyl group; 1-isobenzofuranyl group; 3-isobenzofuranyl group; 4-isobenzofuranyl group; 5-isobenzofuranyl group; 6-isobenzofuranyl group; 7-isobenzofuranyl group; 2-quinolyl group; 3-quinolyl group; 4-quinolyl group; 5-quinolyl group; 6-quinolyl group; 7-quinolyl group; 8-quinolyl group; 1-isoquinolyl group; 3-isoquinolyl group; 4-isoquinolyl group; 5-isoquinolyl group; 6-isoquinolyl group; 7-isoquinolyl group; 8-isoquinolyl group; 2-quinoxalinyl group; 5-quinoxalinyl group; 6-quinoxalinyl group; 1-carbazolyl group; 2-carbazolyl group; 3-carbazolyl group; 4-carbazolyl group; 9-carbazolyl group; 1-phenanthridinyl group; 2-phenanthridinyl group; 3-phenantlridinyl group; 4-phenanthridinyl group; 6-phenanthridinyl group; 7-phenantlridinyl group; 8-phenantlridinyl group; 9-phenanthridinyl group; 10-phenanthridinyl group; 1-acridinyl group; 2-acridinyl group; 3-acridinyl group; 4-acridinyl group; 9-acridinyl group; 1,7-phenanthroline-2-yl group; 1,7-phenanthroline-3-yl group; 1,7-phenanthroline-4-yl group; 1,7-phenanthroline-5-yl group; 1,7-phenanthroline-6-yl group; 1,7-phenanthroline-8-yl group; 1,7-phenanthroline-9-yl group; 1,7-phenanthroline-10-yl group; 1,8-phenanthroline-2-yl group; 1,8-phenanthroline-3-yl group; 1,8-phenanthroline-4-yl group; 1,8-phenanthroline-5-yl group; 1,8-phenanthroline-6-yl group; 1,8-phenanthroline-7-yl group; 1,8-phenanthroline-9-yl group; 1,8-phenanthroline-10-yl group; 1,9-phenanthroline-2-yl group; 1,9-phenanthroline-3-yl group; 1,9-phenanthroline-4-yl group; 1,9-phenanthroline-5-yl group; 1,9-phenanthroline-6-yl group; 1,9-phenanthroline-7-yl group; 1,9-phenanthroline-8-yl group; 1,9-phenanthroline-10-yl group; 1,10-phenanthroline-2-yl group; 1,10-phenanthroline-3-yl group; 1,10-phenanthroline-4-yl group; 1,10-phenanthroline-5-yl group; 2,9-phenanthroline-1-yl group; 2,9-phenanthroline-3-yl group; 2,9-phenanthroline-4-yl group; 2,9-phenanthroline-5-yl group; 2,9-phenanthroline-6-yl group; 2,9-phenanthroline-7-yl group; 2,9-phenanthroline-8-yl group; 2,9-phenanthroline-10-yl group; 2,8-phenanthroline-1-yl group; 2,8-phenanthroline-3-yl group; 2,8-phenanthroline-4-yl group; 2,8-phenanthroline-5-yl group; 2,8-phenanthroline-6-yl group; 2,8-phenanthroline-7-yl group; 2,8-phenanthroline-9-yl group; 2,8-phenanthroline-10-yl group; 2,7-phenanthroline-1-yl group; 2,7-phenanthroline-3-yl group; 2,7-phenanthroline-4-yl group; 2,7-phenanthroline-5-yl group; 2,7-phenanthroline-6-yl group; 2,7-phenanthroline-8-yl group; 2,7-phenanthroline-9-yl group; 2,7-phenanthroline-10-yl group; 1-phenazinyl group; 2-phenazinyl group; 1-phenothiazinyl group; 2-phenothiazinyl group; 3-phenothiazinyl group; 4-phenothiazinyl group; 10-phenothiazinyl group; 1-phenoxazinyl group; 2-phenoxazinyl group; 3-phenoxazinyl group; 4-phenoxazinyl group; 10-phenoxazinyl group; 2-oxazolyl group; 4-oxazolyl group; 5-oxazolyl group; 2-oxadiazolyl group; 5-oxadiazolyl group; 3-furazanyl group; 2-thienyl group; 3-thienyl group; 2-methylpyrrole-1-yl group; 2-methylpyrrole-3-yl group; 2-methylpyrrole-4-yl group; 2-methylpyrrole-5-yl group; 3-methylpyrrole-1-yl group; 3-methylpyrrole-2-yl group; 3-methylpyrrole-4-yl group; 3-methylpyrrole-5-yl group; 2-t-butylpyrrole-4-yl group; 3-(2-phenylpropyl) pyrrole-1-yl group; 2-methyl-1-indolyl group; 4-methyl-1-indolyl group; 2-methyl-3-indolyl group; 4-methyl-3-indolyl group; 2-t-butyl-1-indolyl group; 4-t-butyl-1-indolyl group; 2-t-butyl-3-indolyl group; 4-t-butyl-3-indolyl group; and the derivatives of these groups. The compounds can have one kind alone or a combination of two or more kinds of these groups.

Examples of the substituted or unsubstituted aralkyl groups include: benzyl group; 1-phenylethyl group; 2-phenylethyl group; 1-phenylisopropyl group; 2-phenylisopropyl group; phenyl-t-butyl group; α-naphthylmethyl group; 1-α-naphthylethyl group; 2-α-naphthylethyl group; 1-α-naphthylisopropyl group; 2-α-naphthylisopropyl group; 1-naphthylmethyl group; 1-β-naphthylethyl group; 2-β-naphthylethyl group; 1-β-naphthylisopropyl group; 2-β-naphthylisopropyl group; 1-pyrrolylmethyl group; 2-(1-pyrrolyl) ethyl group; p-methylbenzyl group; m-methylbenzyl group; o-methylbenzyl group; p-chlorobenzyl group; m-chlorobenzyl group; o-chlorobenzyl group; p-bromobenzyl group; m-bromobenzyl group; o-bromobenzyl group; p-iodobenzyl group; m-iodobenzyl group; o-iodobenzyl group; p-hydroxybenzyl group; m-hydroxybenzyl group; o-hydroxybenzyl group; p-aminobenzyl group; m-aminobenzyl group; o-aminobenzyl group; p-nitrobenzyl group; m-nitrobenzyl group; o-nitrobenzyl group; p-cyanobenzyl group; m-cyanobenzyl group; o-cyanobenzyl group; 1-hydroxy-2-phenylisopropyl group; and 1-chloro-2-phenylisopropyl group. The compounds can have one kind alone or a combination of two or more kinds of these groups.

The substituted or unsubstituted amino groups are those represented by —$NX^1X^2$, and the substituents $X^1$ and $X^2$ are independently, for example, hydrogen atom, the aforementioned substituted or unsubstituted alkyl group, the substituted or unsubstituted alkenyl group, the substituted or unsubstituted cycloalkyl group, the substituted or unsubstituted aromatic hydrocarbon group, the substituted or unsubstituted aromatic heterocyclic group, the substituted or unsubstituted aralkyl group or the like. The compounds can have one kind alone or a combination of two or more kinds of these groups.

The substituted or unsubstituted alkoxy groups and the substituted or unsubstituted alkoxycarbonyl groups are those represented by —$OX^3$ and —$COOX^4$, respectively, and each of the substituents $X^3$ and $X^4$ is, for example, the aforementioned substituted or unsubstituted alkyl group, the substituted or unsubstituted cycloalkyl group, the substituted or unsubstituted aralkyl group or the like. The compounds can have one kind alone or a combination of two or more kinds of these groups.

The substituted or unsubstituted aryloxy groups and the substituted or unsubstituted aryloxycarbonyl groups are those represented by —$OX^5$ and —$COOX^6$, respectively, and each of the substituents $X^5$ and $X^6$ is, for example, the aforementioned substituted or unsubstituted aromatic hydrocarbon group, the substituted or unsubstituted aromatic heterocyclic group or the like. The compounds can have one kind alone or a combination of two or more kinds of these groups.

The substituted or unsubstituted acyl groups are those represented by —$C(=O)X^7$, and the substitutent $X^7$ is, for example, hydrogen atom, the aforementioned substituted or unsubstituted alkyl group, the substituted or unsubstituted alkenyl group, the substituted or unsubstituted cycloalkyl group, the substituted or unsubstituted aromatic hydrocarbon group, the substituted or unsubstituted aromatic heterocyclic group, the substituted or unsubstituted aralkyl group or the like. The compounds can have one kind alone or a combination of two or more kinds of these groups.

Examples of the bivalent group which form a ring include: tetramethylene group; pentamethylene group; hexamethylene group; diphenylmethane-2; 2'-diyl group; diphenylethane-3; 3'-diyl group; diphenylpropane-4; 4'-diyl group; 1,3-butadiene-1; 4-diyl group; and the derivatives of these groups.

One or more atoms of the above-mentioned substituents may be substituted with a sulfur atom(s), a silicon atom(s), a phosphorus atom(s) or a boron atom(s). As an example of the group, in which at least one atom is substituted with the sulfur atom, may be cited the substitutent which is obtained by substituting the sulfur atom for the oxygen atom of an oxygen containing group, such as hydroxyl group, carboxyl group, alkoxy group, alkoxycarbonyl group, aryloxy group, aryloxycarbonyl group, or acyl group. Examples of the substitutent include mercapto group, dithiocarboxyl group, hydroxy (thiocarbonyl) group, mercaptocarbonyl group, methylthio group, methoxythiocarbonyl group, methylthiocarbonyl group, methyldithiocarboxyl group, phenylthio group, phenoxythiocarbonyl group, phenylthiocarbonyl group, and phenyldithiocarbonyl group. As an example of the group, in which at least one atom is substituted with the silicon atom, may be cited the substitutent which is obtained by substituting the silicon atom for the carbon atom of such group as alkyl group, alkenyl group, cycloalkyl group, or aralkyl group. Examples of the substitutent include silyl group, methylsilyl group, silylmethyl group, ethylsilyl group, (methylsilyl) methyl group, dimethylsilyl group, trimethylsilyl group, t-butyldimethylsilyl group, and triisopropylsilyl group. As an example of the group, in which at least one atom is substituted with the phosphorous atom, may be cited the substitutent which is obtained by substituting the phosphorous atom for the nitrogen atom of the amino group. Examples of the substitutent include phosphino group, trimethylphosphino group, and triphenylphosphino group. As an example of the group, in which at least one atom is substituted with the boron atom, may be cited the substitutent which is obtained by substituting the boron atom for the nitrogen atom of the amino group. Examples of the substitutent include dimethylboryl group and diphenylboryl group.

With regard to the molecular weight of the diazine N,N'-dioxide compound, low-molecular weight is preferable in the interest of the solubility in the electrolytic solution. Concerning polyacene type compounds, n+m+n'+m' is preferably 20 or less than 20, and more desirably, n+m+n'+m' is 10 or less than 10. Concerning oligomer or polymer compounds, 200,000 or less than 200,000 is preferable, and 100,000 or less than 100,000 is more desirable as weight-average molecular weight according to gel permeation chromatography (standard sample: polystyrene).

The diazine N,N'-dioxide compound of the present invention can be produced by such known synthetic method as to oxidize a corresponding diazine compound by peroxide or peracid. For example, there is described a synthetic method using urea peroxide in Syn. Lett., p.533-535, September 1999. Besides, the chemical compound represented by the following chemical formula (8), for example, can be obtained as follows: a dichloromethane solution of metachloroperbenzoic acid is added to a dichloromethane solution of tetramethylpyrazine; subsequently, the solution is stirred at room temperature; after that, a saturated aqueous solution of sodium carbonate is added thereto for neutralization; and the solution is purified in a manner common to the art.

The oligomer or polymer type diazine N,N'-dioxide compound, for example, can be obtained by the following methods. According to one method, an oligomer or polymer compound provided with a bivalent group having two bonds as a structure unit in the condensed ring of a condensed ring compound having a diazine ring (pyrazine ring) in the condensed ring is allowed to react with peroxide so that a nitrogen atom(s) in the condensed ring is/are N-oxidized. As another method, a nonvalent nickel compound is added to a dihalide compound obtained by substituting halogen for two of the substituents of the condensed ring of a polyacene type diazine N,N'-dioxide compound in an organic solvent so as to dehalogenate the dihalide compound.

The diazine N,N'-dioxide compound of the present invention undergoes an oxidative reaction at an overcharge voltage, and consumes overcharge capacity. Consequently, it is possible to prevent thermal instability in the positive and negative electrodes caused by excess lithium ions released from the positive electrode and deposited on the negative electrode in an overcharged state. Accordingly, in an overcharged state, the safety of the battery can be secured.

The diazine N,N'-dioxide compound of the present invention is preferably present in the above-mentioned electrolytic solution in amounts within the range of 0.1 to 20 percent by weight, more preferably within the range of 0.5 to 10 percent by weight, and most desirably within the range of 1 to 5 percent by weight. The excessively low content of the compound in the electrolytic solution results in the insufficiency of safety in an overcharged state, while the excessively high content of the compound deteriorates battery characteristics such as low-temperature characteristic and cycle characteristic.

The diazine N,N'-dioxide compound of the present invention may be dissolved in the electrolytic solution or may be in a condition where minute particles of the compound are dispersed, preferably, however, the compound is dissolved in the electrolytic solution. When the diazine N,N'-dioxide compound is dissolved in the electrolytic solution, the oxidative reaction is accelerated in an overcharged state, which improves the safety of the battery.

The following chemical formulas (2) to (22) represent concrete examples of the diazine N,N'-dioxide compound according to the present invention.

(2)

(3)

(4)

(5)

(6)

(7)

(8)

(9)

-continued

Incidentally, for manufacturing the battery of the present invention, the electrolytic solution may contain the above-described diazine N,N'-dioxide compound itself or a chemical compound (precursor compound) which is converted into the diazine N,N'-dioxide compound by the electrochemical reaction.

[1-2] Electrolytic Solution and Solvent

In accordance with the present invention, the role of the electrolytic solutions is to transfer electric charge carriers between the electrodes. The electrolytic solutions in general have preferably ion-conductivities of $10^{-5}$ to $10^{-1}$ S/cm at room temperature. The electrolytic solutions which are prepared by dissolving electrolytic salts in organic solvents may be utilized.

For example, already known materials like lithium compounds, such as $LiPF_6$, $LiClO_4$, $LiBF_4$, $LiAsF_6$, $LiCF_3SO_3$, $Li(CF_3SO_2)_2N$, $Li(C_2F_5SO_2)_2N$, $Li(CF_3SO_2)_3C$, $Li(C_2F_5SO_2)_3C$, etc. may be utilized as the electrolytic salts for the electrolytic solutions of the present invention.

Examples of the solvents used for the electrolytic solutions of the present invention include ethylenecarbonate, propylenecarbonate, butylenecarbonate, dimethylcarbonate, diethylcarbonate, methylethylcarbonate, γ-butyrolactone, γ-valerolactone, dimethoxyethane, tetrahydrofuran, dioxolane, methyldioxolane, sulfolane, dimethylsulfoxide, trimethyl phosphate, dimethylformamide, dimethylacetamide, and N-methyl-2-pyrrolidone. Incidentally, according to the present invention, these solvents may be used either individually or in mixtures with each other as mixed solvents of two or more kinds.

[2] Active Material

The following already known materials can be utilized as the active materials of the battery according to the present invention.

Transition metal oxides, disulfide compounds, conductive polymers and the like can be used as the active materials of the positive electrode. Examples of the transition metal oxides include lithium manganates such as $LiMnO_2$ and $Li_xMn_2O_4$ ($0<x<2$), lithium manganates having spinel structures, $MnO_2$, $LiCoO_2$, $LiNiO_2$, and $Li_xV_2O_5$ ($0<x<2$). Examples of the disulfide compounds include: dithioglycol; 2,5-dimercapto-1,3,4-thiadiazole; and S-triazine-2,4,6-trithiol. Besides, examples of the conductive polymers include polyacetylene, polyphenylene, polyaniline and polypyrrole. These active materials of the positive electrode can be used either singularly or in combination with each other as a combination of two or more kinds.

On the other hand, examples of the active materials of the negative electrode include graphite, amorphous carbon, lithium metal, lithium alloy, lithium ion absorbing carbon, and conductive-polymers. These materials can be utilized either singularly or in combination with each other as a combination of two or more kinds.

Incidentally, there are imposed no special limitations upon the shapes of the active materials. For example, the lithium metal and the lithium alloy can be utilized as bulk, solidified powders, fibers, flakes in addition to foils.

[3] Conductive Adjuvant and Ion-Conductive Adjuvant

In accordance with the present invention, when forming the electrodes, a conductive adjuvant(s) or an ion-conductive adjuvant(s) may be mixed with the electrodes for the purpose of reducing the impedance of the electrodes. The conductive adjuvant is, for example, cabonaceous fine particles such as graphite, carbon black and acetylene black; or a conductive polymer such as polyaniline, polypyrrole, polythiophene, polyacetylene and polyacene. Besides, gel electrolytes and solid electrolytes may be cited as examples of the ion-conductive adjuvant.

[4] Binding Material

In accordance with the present invention, binding material(s) may be mixed with the electrode materials for the purpose of increasing the bond strength between the constituent materials of the electrodes. Examples of the binding material include resin binders such as polyvinylidene fluoride, vinylidene fluoride-hexafluoropropylene copolymer, vinylidene fluoride-tetrafluoroethylene copolymer, styrene-butadiene copolymer rubber, polytetrafluoroethytene, polypropylene, polyethylene, and polyimide.

[5] Catalyst

In accordance with the present invention, the battery may contain a catalyst(s) which promotes the reaction of additive(s) in the electrolytic solution for the purpose of enhancing the safety of the battery in an overcharged state. Examples of the catalyst include: conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal ion complexes.

[6] Collector and Separator

In accordance with the present invention, metal foils or metal plates made of nickel, aluminum, copper, gold, silver, aluminum alloy or stainless steel, meshed electrodes and carbon electrodes may be used as the collectors of the positive and negative electrodes. The collectors may be allowed to have catalytic activity and to form a chemical bond with active materials. For the purpose of avoiding electrical contact between the collectors of the negative electrode and the positive electrode, an insulating packing made of a plastic resin, etc. may be arranged between them.

A porous film or non-woven cloth can be used for the separator that is employed for the purpose of avoiding contact between the positive electrode and the negative electrode.

[7] The Shape of the Battery

In accordance with the present invention, there are imposed no particular limitations upon the shape and exterior appearance of the battery, and conventionally known types of batteries can be adopted. That is, the battery may be given, for example, the shape of layered or wound electrodes which are sealed by a metal case, a resin cases, or a laminated film composed of metal foil such as aluminum one and synthetic resin or plastic film. Examples of the exterior appearance of the battery include cylinder types, square types, coin types and sheet types.

[8] The Type of Layers of Electrodes

The present invention imposes no special limitations upon the type of layers formed by the positive and negative electrodes, and any type of layers can be adopted. For example, the positive and negative electrodes may be in multiple layers, or may be stacked on both sides of the collector in layers and combined together. Additionally, the layers may be wound.

[9] The Methods of Producing the Electrodes and the Battery

In accordance with the present invention, there are imposed no special limitations upon the methods of producing the electrodes and the battery, and methods well known in the art can be adopted.

The electrodes may be produced in such a manner as to coat the slurry, which is made by adding a solvent to the components of the electrodes, on the collector; to compact the components of the electrodes with binder resin together by applying pressure, or to bake the components of the electrodes by heating.

The battery is manufactured as for example by the steps of stacking a produced electrode and a counter electrode in layers with a separator therebetween, winding the layered electrodes as needed, covering the obtained electrodes with an exterior body, injecting an electrolytic solution into the body, and sealing it.

Hereinafter, examples of the present invention will be concretely described, however, the examples described below are illustrative only and are not intended to limit the scope of the invention.

EXAMPLE 1

An electrolytic solution was prepared by mixing the diazine N,N'-dioxide compound represented by formula (2) in an ethylenecarbonate-diethylcarbonate mixed solution (mixture ratio 3:7 by volume) containing 1 mol/l (1M) of electrolytic salt $LiPF_6$, so that the compound constitutes 3% by weight of the mixture.

$LiCoO_2$, conductive adjuvants (acetylene black and artificial graphite) and polyvinylidene fluoride were dispersed and mixed in N-methyl-2-pyrrolidone, and the mixture was applied over aluminum foil to obtain the positive electrode. On the other hand, natural graphite and polyvinylidene fluoride were dispersed and mixed in N-methyl-2-pyrrolidone, and the mixture was applied over copper foil to obtain the negative electrode. In addition, a nonwoven polypropylene fabric was utilized as a separator.

After attaching tabs to the positive and negative electrodes, the electrodes were stacked in layers with the separator between them, and wound to form an electrode element. The electrode element was accommodated together with the above-described electrolytic solution in an exterior body that is made of an aluminum laminate film, and the exterior body was subsequently sealed. Thus, a square battery was obtained

EXAMPLE 2

A battery was produced in the same manner as in Example 1 except for using an electrolytic solution and a positive electrode, in place of those used in Example 1, as follows:

electrolytic solution: an electrolytic solution obtained by mixing the diazine N,N'-dioxide compound represented by formula (3) in an ethylenecarbonate-diethylcarbonate mixed solution (mixture ratio 3:7 by volume) containing 1 mol/l of electrolytic salt $LiPF_6$ so that the compound constitutes 3% by weight of the mixture;

positive electrode: a positive electrode obtained by dispersing and mixing $LiNiO_2$, conductive adjuvants (acetylene black and artificial graphite) and polyvinylidene fluoride in N-methyl-2-pyrrolidone, and applying the mixture over aluminum foil.

EXAMPLE 3

A battery was produced in the same manner as in Example 1 except for using an electrolytic solution and a positive electrode, in place of those used in Example 1, as follows:

electrolytic solution: an electrolytic solution obtained by mixing the diazine N,N'-dioxide compound represented by formula (4) in an ethylenecarbonate-diethylcarbonate mixed solution (mixture ratio 3:7 by volume) containing 1 mol/l of electrolytic salt $LiPF_6$ so that the compound constitutes 3% by weight of the mixture;

positive electrode: a positive electrode obtained by dispersing and mixing $LiNiO_2$, conductive adjuvants (acetylene black and artificial graphite) and polyvinylidene fluoride in N-methyl-2-pyrrolidone, and applying the mixture over aluminum foil.

EXAMPLES 4 AND 5

Batteries were produced in the same manner as in Example 1 except for using electrolytic solutions, in place of that used in Example 1, as follows:

electrolytic solutions: electrolytic solutions prepared by mixing the diazine N,N'-dioxide compounds represented by formulas (5) and (6) in an ethylenecarbonate-diethylcarbonate mixed solution (mixture ratio 3:7 by volume) containing 1 mol/l of electrolytic salt $LiPF_6$ in examples 4 and 5, respectively, so that the compound constitutes 2% by weight of the mixture.

EXAMPLES 6 AND 7

Batteries were produced in the same manner as in Example 1 except for using electrolytic solutions, in place of that used in Example 1, as follows:

electrolytic solutions: electrolytic solutions prepared by mixing the diazine N,N'-dioxide compounds represented by formulas (7) and (8) in an ethylenecarbonate-diethylcarbonate mixed solution (mixture ratio 3:7 by volume) containing 1 mol/l of electrolytic salt $LiPF_6$, in examples 6 and 7, respectively, so that the compound constitutes 4% by weight of the mixture.

COMPARATIVE EXAMPLE 1

A battery was produced in the same manner as in Example 1 except for using an electrolytic solution, in place of that used in Example 1, as follows:

electrolytic solution: an ethylenecarbonate-diethylcarbonate mixed solution (mixture ratio 3:7 by volume) containing 1 mol/l of electrolytic salt $LiPF_6$.

COMPARATIVE EXAMPLE 2

A battery was produced in the same manner as in Example 1 except for using an electrolytic solution and a positive electrode, in place of those used in Example 1, as follows:

electrolytic solution: an ethylenecarbonate-diethylcarbonate mixed solution (mixture ratio 3:7 by volume) containing 1 mol/l of electrolytic salt $LiPF_6$;

positive electrode: a positive electrode obtained by dispersing and mixing $LiNiO_2$, conductive adjuvants (acetylene black and artificial graphite) and polyvinylidene fluoride in N-methyl-2-pyrrolidone, and applying the mixture over aluminum foil.

COMPARATIVE EXAMPLE 3

A battery was produced in the same manner as in Example 1 except for using an electrolytic solution, in place of that used in Example 1, as follows:

electrolytic solution: an electrolytic solution prepared by mixing difluoro-anisole in an ethylenecarbonate-diethylcarbonate mixed solution (mixture ratio 3:7 by volume) containing 1 mol/l of electrolytic salt $LiPF_6$ so that difluoroanisole constitutes 4% by weight of the mixture.

COMPARATIVE EXAMPLE 4

A battery was produced in the same manner as in Example 1 except for using an electrolytic solution, in place of that used in Example 1, as follows:

electrolytic solution: an electrolytic solution prepared by mixing biphenyl in an ethylenecarbonate-diethylcarbonate mixed solution (mixture ratio 3:7 by volume) containing 1 mol/l of electrolytic salt $LiPF_6$ so that biphenyl constitutes 4% by weight of the mixture.

[Overcharge Test]

The batteries produced in Example 2 and Comparative Example 2 were charged up to 4.1V with a constant current of 120 mA (0.2 C), and were subsequently charged with a constant voltage of 4.1V for 2.5 hours so that the batteries were fully charged. The other batteries were charged up to 4.2V with a constant current of 120 mA (0.2 C), and were subsequently charged with a constant voltage of 4.2V for 2.5 hours so that the batteries were fully charged.

Those fully charged batteries were overcharged with a charging current of 120 mA (0.2 C) for a maximum of 7.5 hours. On that occasion, the maximum voltage was set at 12V, and when the voltage of each of the batteries exceeded 12V, the charging was suspended. The highest temperature of each battery that was being overcharged was measured.

[Low-Temperature Characteristic Test]

Each of the aforementioned secondary batteries was charged at 20° C., and discharged at –20° C. and 20° C. The discharge current was set at 600 mA (1 C). The ratio of the battery capacity under discharge conditions of –20° C. and 600 mA (1 C) to that under discharge conditions of 20° C. and 600 mA (1 C) was obtained.

[Cycle Test]

Each of the aforementioned secondary batteries was discharged at 20° C. The ratio of the service capacity after 300 cycles to that at the beginning was obtained.

[Test Results]

Results in the above-mentioned tests are shown in Table 1. While the batteries produced by using an electrolytic solution that contains no additives in Comparative Examples 1 and 2 were ignited or burst in an overcharged state, the highest temperatures of the batteries in Examples 1 to 7 were below 100° C. in an overcharged state. From this it is to be understood that when the diazine N,N'-dioxide compound is contained in an electrolytic solution, the safety of the battery in an overcharged state is improved.

In addition, the batteries in Examples 1 to 7 showed low-temperature characteristics and cycle characteristics equivalent or comparable to those of the batteries in Comparative Examples 1 and 2. However, the low-temperature characteristics and the cycle characteristics of the batteries in Comparative Examples 3 and 4 were inferior to those of the batteries in Comparative Examples 1 and 2. From this it is to be understood that even if the diazine N,N'-dioxide compound is contained in an electrolytic solution, the low-temperature characteristic and the cycle characteristic of the battery are not adversely affected.

TABLE 1

| | Additive to Electrolyte | Active Material of Positive Electrode | Highest Temperature (° C.) | Low-Temperature Characteristic (%) | Cycle Characteristic (%) |
|---|---|---|---|---|---|
| Example 1 | Formula (2) | $LiCoO_2$ | 94 | 68 | 85 |
| Example 2 | Formula (3) | $LiNiO_2$ | 100 | 63 | 79 |
| Example 3 | Formula (4) | $LiNiO_2$ | 92 | 74 | 85 |
| Example 4 | Formula (5) | $LiCoO_2$ | 84 | 75 | 87 |
| Example 5 | Formula (6) | $LiCoO_2$ | 84 | 71 | 84 |
| Example 6 | Formula (7) | $LiCoO_2$ | 89 | 71 | 85 |
| Example 7 | Formula (8) | $LiCoO_2$ | 98 | 75 | 84 |
| Comparative Example 1 | No Additive | $LiCoO_2$ | Ignition | 73 | 86 |
| Comparative Example 2 | No Additive | $LiNiO_2$ | Ignition/Burst | 61 | 79 |
| Comparative Example 3 | Difluoroanisole | $LiCoO_2$ | 121 | 41 | 58 |
| Comparative Example 4 | Biphenyl | $LiCoO_2$ | 118 | 38 | 64 |

INDUSTRIAL APPLICABILITY

In accordance with the present invention, it is possible to realize a battery comprising at least a positive electrode, a negative electrode, and an electrolytic solution, which has excellent safety in an overcharged state and is excellent in battery characteristics such as low-temperature characteristics and cycle characteristics by the diazine N,N'-dioxide compound contained in the electrolytic solution.

The invention claimed is:

1. An electrolytic solution for a secondary battery comprising a solvent and a compound which has a diazine N,N'-dioxide structure expressed by general formula (1):

in which n, m, n', and m' each independently denote an integer 0 (zero) or larger; the diazine rings and the benzene rings may be condensed alternately or randomly; and substituents $R_1$, $R_2$, $R_3$, $R_4$, $R^a$, $R^b$, $R^c$, and $R^d$ each independently represent a hydrogen atom, a halogen atom, a hydroxyl group, a nitro group, a nitroso group, a cyano group, a carboxyl group, a substituted or unsubstituted alkyl group, a substituted or unsubstituted alkenyl group, a substituted or unsubstituted cycloalkyl group, a substituted or unsubstituted aromatic hydrocarbon group, a substituted or unsubstituted aromatic heterocyclic group, a substituted or unsubstituted aralkyl group, a substituted or unsubstituted amino group, a substituted or unsubstituted alkoxy group, a substituted or unsubstituted aryloxy group, a substituted or unsubstituted alkoxycarbonyl group, a substituted or unsubstituted aryloxycarbonyl group, and a substituted or unsubstituted acyl group, wherein: when n is 2 or larger, then $R^a$ and $R^b$ may be the same or different; and when n' is 2 or larger, then $R^c$ and $R^d$ may be the same or different, and wherein: in these substituents, one or more of the atoms may be substituted with one or more sulfur atoms, silicon atoms, phosphorus atoms or boron atoms; and the substituents may form a ring structure in cooperation with each other; and wherein the solvent comprises an organic solvent in which a lithium salt is dissolved.

2. An electrolytic solution for a secondary battery comprising a solvent and an oligomer or polymer compound which includes a bivalent group having two bonds as a structure unit in substitution for two of substituents $R_1$, $R_2$, $R_3$, $R_4$, $R^a$, $R^b$, $R^c$, and $R^d$ of a compound provided with a diazine N,N'-dioxide structure expressed by general formula (1):

in which, n, m, n', and m' each independently denote an integer 0 (zero) or larger; the diazine rings and the benzene rings may be condensed alternately or randomly; and substituents $R_1$, $R_2$, $R_3$, $R_4$, $R^a$, $R^b$, $R^c$, and $R^d$ each independently represent a hydrogen atom, a halogen atom, a hydroxyl group, a nitro group, a nitroso group, a cyano group, a carboxyl group, a substituted or unsubstituted alkyl group, a substituted or unsubstituted alkenyl group, a substituted or unsubstituted cycloalkyl group, a substituted or unsubstituted aromatic hydrocarbon group, a substituted or unsubstituted aromatic heterocyclic group, a substituted or unsubstituted aralkyl group, a substituted or unsubstituted amino group, a substituted or unsubstituted alkoxy group, a substituted or unsubstituted aryloxy group, a substituted or unsubstituted alkoxycarbonyl group, a substituted or unsubstituted aryloxycarbonyl group, and a substituted or unsubstituted acyl group, wherein: when n is 2 or larger, then $R^a$ and $R^b$ may be the same or different; and when n' is 2 or larger, then $R^c$ and $R^d$ may be the same or different, and wherein: in these substituents, one or more of the atoms may be substituted with one or more sulfur atoms, silicon atoms, phosphorus atoms or boron atoms; and the substituents may form a ring structure in cooperation with each other; and wherein the solvent comprises an organic solvent in which a lithium salt is dissolved.

3. The electrolytic solution for a secondary battery according to claim 1, wherein at least part of the compound having the diazine N,N'-dioxide structure is dissolved in the electrolytic solution.

4. A secondary battery comprising a positive electrode, a negative electrode, and the electrolytic solution according to claim 1.

5. The secondary battery claimed in claim 4, which is a lithium secondary battery.

6. The electrolytic solution for a secondary battery according to claim 2, wherein at least part of the oligomer or polymer compound is dissolved in the electrolytic solution.

7. A secondary battery comprising a positive electrode, a negative electrode, and the electrolytic solution according to claim 2.

8. The secondary battery according to claim 7, which is a lithium secondary battery.

9. A secondary battery comprising a positive electrode, a negative electrode, and the electrolytic solution according to claim 3.

10. The secondary battery according to claim 9, which is a lithium secondary battery.

11. A secondary battery comprising a positive electrode, a negative electrode, and the electrolytic solution according to claim 6.

12. The secondary battery according to claim 11, which is a lithium secondary battery.

13. The electrolytic solution for a secondary battery according to claim 1, further comprising an oligomer or polymer compound which includes a bivalent group having two bonds as a structure unit in substitution for two of substituents $R_1$, $R_2$, $R_3$, $R_4$, $R^a$, $R^b$, $R^c$, and $R^d$ of the compound provided with the diazine N,N'-dioxide structure expressed by general formula (1), wherein at least part of the oligomer or polymer compound is dissolved in the electrolytic solution.

14. The electrolytic solution for a secondary battery according to claim 2, further comprising a compound which has the diazine N,N'-dioxide structure expressed by general formula (1), wherein at least part of the compound having the diazine N,N'-dioxide structure is dissolved in the electrolytic solution.

* * * * *